(12) United States Patent
Koga et al.

(10) Patent No.: US 6,345,226 B1
(45) Date of Patent: Feb. 5, 2002

(54) SPEED RATIO CONTROL DEVICE FOR VEHICLE

(75) Inventors: Masato Koga, Atsugi; Mitsuru Watanabe, Hadano; Satoshi Takizawa, Yokohama; Masatoshi Akanuma, Fujisawa; Shigeki Shimanaka, Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/672,874

(22) Filed: Sep. 29, 2000

(30) Foreign Application Priority Data

Sep. 30, 1999 (JP) .......................................... 11-280362

(51) Int. Cl.$^7$ .......................... B60K 41/44; F16H 61/00
(52) U.S. Cl. ............................. 701/71; 701/51; 477/37; 477/46; 477/44; 477/45; 477/48
(58) Field of Search ............................. 701/71, 51, 70, 701/60, 61, 54; 477/49, 344, 68, 48, 37, 43, 47

(56) References Cited

U.S. PATENT DOCUMENTS

| 5,109,962 A | 5/1992 | Sato ........................... 192/4 A |
| 5,240,094 A | 8/1993 | Suzuki ........................ 192/4 A |
| 5,383,125 A | 1/1995 | Hibi ....................... 364/426.03 |
| 6,146,307 A | * 11/2000 | Takizawa et al. .............. 477/37 |
| 6,157,884 A | * 12/2000 | Narita et al. ................... 701/51 |
| 6,165,101 A | * 12/2000 | Takizawa et al. .............. 477/37 |
| 6,183,390 B1 | * 2/2001 | Koga et al. .................... 477/37 |

FOREIGN PATENT DOCUMENTS

| DE | 43 01 591 | 7/1993 |
| EP | 0 373 865 | 6/1990 |
| JP | 2-234851 | 9/1990 |
| JP | 403079852 | * 4/1991 |

* cited by examiner

Primary Examiner—Tan Nguyen
Assistant Examiner—Tuan C To
(74) Attorney, Agent, or Firm—Foley & Lardner

(57) ABSTRACT

When a slip control system is not operating, a speed ratio control device uses a sensor detected vehicle speed for speed ratio control, and when the slip control system is operating, it uses an estimated vehicle speed for speed ratio control. It is determined whether a variation amount of the estimated vehicle speed is greater than a threshold set to a variation amount which could not be obtained when there is no error. When the variation amount of the estimated vehicle speed is greater than the threshold, it is determined that the estimated vehicle speed is abnormal, and use of the estimated vehicle speed for speed ratio control is prohibited.

14 Claims, 12 Drawing Sheets

SPEED RATIO CONTROL DEVICE FOR VEHICLE

FIELD OF THE INVENTION

The present invention relates to speed ratio control of a vehicle equipped with a slip control system and a continuously variable transmission (CVT).

BACKGROUND OF THE INVENTION

When slip control systems, such as an anti-lock brake system (ABS) or a traction control system (TCS), are operating, a braking force or drive force fluctuates and a sensor detected vehicle speed (=drive wheel speed) fluctuates. Therefore, if speed ratio control is performed based on the sensor detected vehicle speed, a speed ratio may vary suddenly. If the speed ratio varies suddenly during operation of a slip control system, the effectiveness of slip suppression by the slip control system will decline.

In JP-A-H2-234851 published by the Japanese Patent Office in 1990, a technique is disclosed of preventing a sudden change of speed ratio so as to prevent the decline of slip suppression by performing speed ratio control based not on the sensor detected vehicle speed, but on an estimated vehicle speed (=driven wheel speed).

SUMMARY OF THE INVENTION

However, in the aforesaid speed change control device, if the estimated vehicle speed becomes abnormal because of:
- an incorrect estimation of the vehicle speed due to a failure of a sensor, etc.,
- a communication error due to a break in a harness, or
- a running on a chassis dynamometer (estimated vehicle speed is zero as driven wheels are on a free roller and do not rotate),
    - the speed ratio changes suddenly when the vehicle speed used for speed ratio control changes over from the sensor detected vehicle speed to the estimated vehicle speed, or from the estimated vehicle speed to the sensor detected vehicle speed according to the operating state of a slip control system. Also, the speed ratio will vary abruptly if the estimated vehicle speed varies abruptly when the slip control system operates and speed ratio control is performed based on the estimated vehicle speed. If the speed ratio varies suddenly, a shift shock will occur or the slip will recur.

Moreover, as the estimated vehicle speed is always zero when running on the chassis dynamometer, if the slip control system operates and the estimated vehicle speed is used for speed ratio control instead of the sensor detected vehicle speed, the speed ratio will suddenly change to the maximum speed ratio.

It is therefore an object of this invention to prevent the speed ratio from varying suddenly even if the estimated vehicle speed becomes abnormal, and to prevent slip with shift shock from recurring.

In order to achieve the above object, the present invention provides a speed ratio control device used with a vehicle comprising a continuously variable transmission and a slip control system for suppressing a slip of a drive wheel by controlling either of braking force and drive force. The device comprises a sensor which detects a vehicle speed, an actuator which varies a speed ratio of the transmission, and a microprocessor programmed to estimate the vehicle speed based on a running state, compute a target speed ratio of the transmission based on the sensor detected vehicle speed when the slip control system is not operating, compute the target speed ratio of the transmission based on the estimated vehicle speed when the slip control system is operating, and control the actuator so that the speed ratio of the transmission approaches the target speed ratio. The microprocessor is further programmed to determine whether the estimated vehicle speed is abnormal, and prohibit use of the estimated vehicle speed in speed ratio control when it is determined that the estimated vehicle speed is abnormal.

The details as well as other features and advantages of this invention are set forth in the remainder of the specification and are shown in the accompanying drawings.

DESCRIPTION OF THE PREFERRED EMBODIMENTS

Figure 1:
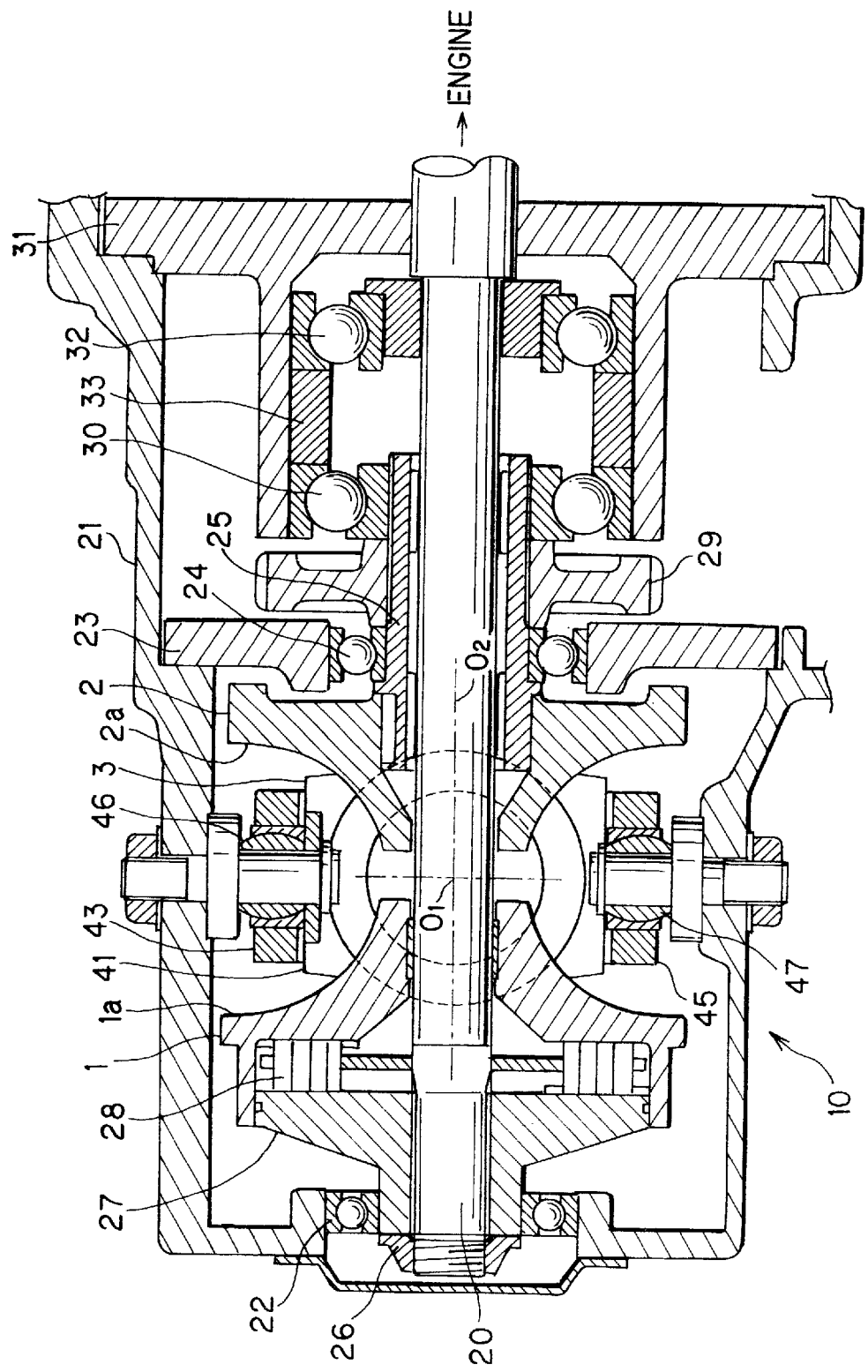
FIG. 1 is a longitudinal cross-sectional view of a toroidal continuously variable transmission according to this invention.

Referring to FIG. 1 of the drawings, a toroidal continuously variable transmission (CVT) 10 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power roller 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 2:
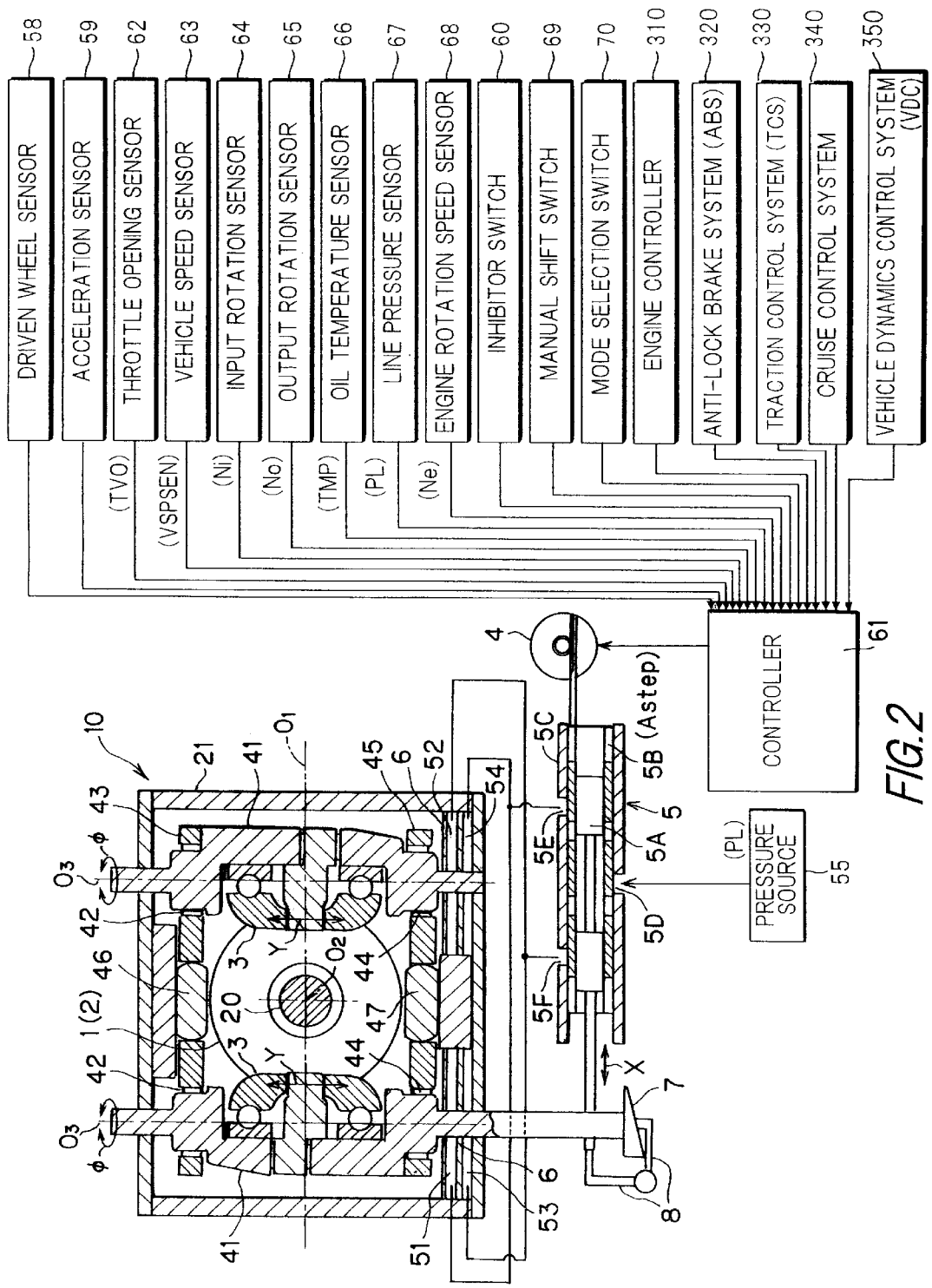
FIG. 2 is a transverse cross-sectional view of the transmission, and a schematic diagram of a speed ratio control device.

The power rollers 3 are supported free to rotate by trunnions 41, as shown in FIG. 2. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot.

The upper link 43 and the lower link 45 are supported with their centers free to pivot on spherical joints 46, 47, and the trunnions 41 can be displaced vertically in synchronism in mutually opposite directions.

The speed ratio control device of the aforesaid transmission 10 will now be described referring to FIG. 2.

A piston 6 for displacing the trunnion 41 in a vertical direction is provided at each trunnion 41. Upper chambers 51, 52 and lower chambers 53, 54 are respectively formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are free to slide relative to each other. The sleeve 5B fits in the valve case 5C so that they are free to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link 8. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 2, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intersects the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and gyration angle φ of the trunnion 41 and power roller 3 as a displacement X of the spool 5A via the link 8.

When a speed ratio command value corresponding to a command value Astep to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the gyration angle φ of the power roller 3 a value corresponding to the speed ratio command value, it is sufficient for the precess cam 7 to feed back the gyration angle φ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 2.

driven wheel speed signal from a driven wheel speed sensor 58 acceleration signal from an acceleration sensor 59 throttle opening signal TVO from a throttle opening sensor 62 sensor detected vehicle speed signal VSPSEN from a vehicle speed sensor 63 transmission input rotation speed signal Ni (or engine rotation speed signal Ne) from an input rotation sensor 64 transmission output rotation speed signal No from an output rotation sensor 65 transmission oil temperature signal TMP from an oil temperature sensor 66 line pressure signal PL from a line pressure sensor 67 engine rotation speed a Ne from an engine rotation speed sensor 68 shift lever position signal from an inhibitor switch 60 up-shit signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340 signal showing an operating state of a vehicle dynamics control system (VDC) 350 from the vehicle dynamics system 350.

Here, as the line pressure PL is controlled by the controller 61, it is usually detected from an internal signal of the controller 61. The vehicle speed sensor 63 detects the vehicle speed from a rotation speed of, for example, the output shaft of the transmission 10, a drive shaft or a driving wheel.

The controller 61 computes the command value Astep to the step motor 4 on the basis of the aforesaid input signals.

Figure 3:
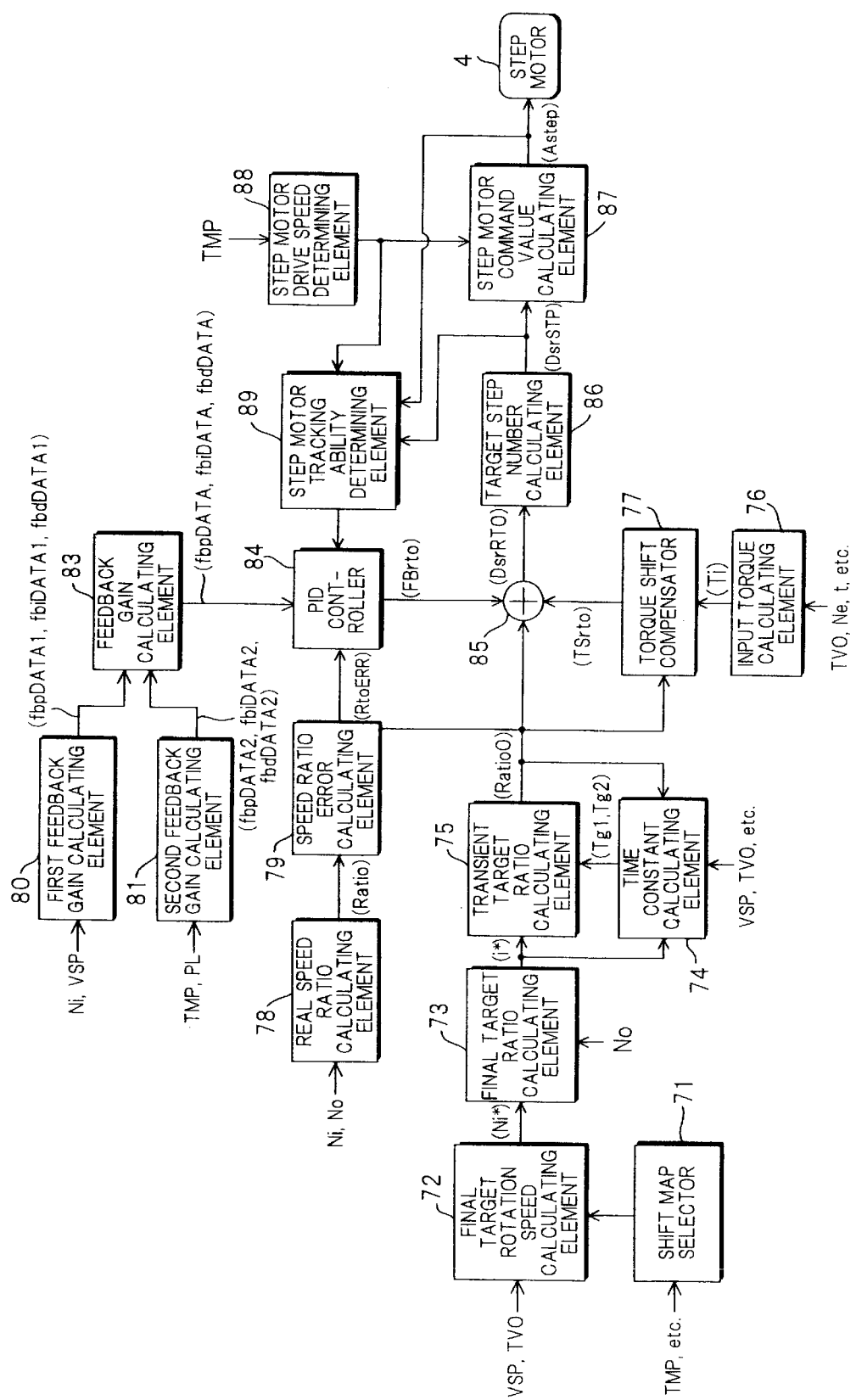
FIG. 3 is a block dram of a controller of the speed ratio control device.

The controller 61 comprises the elements shown in FIG. 3. These elements actually comprise a computer program stored by the memory of the controller 61 or an electronic circuit of the controller 61.

Figure 4:
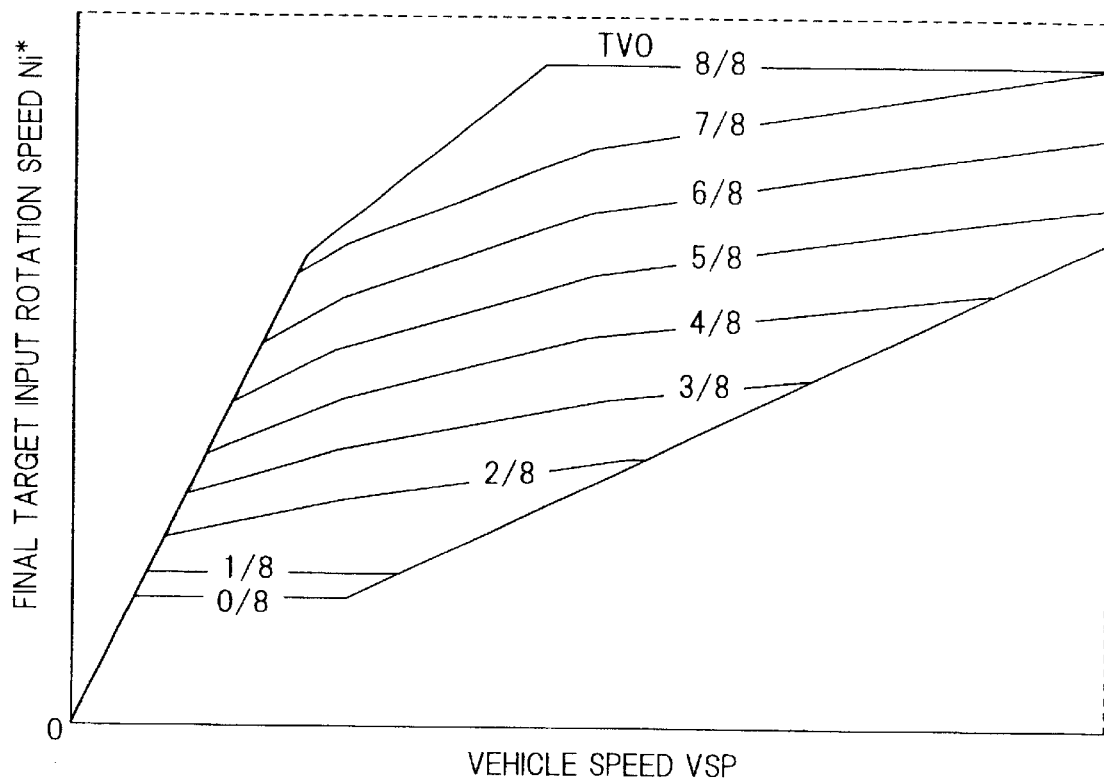
FIG. 4 is an example of a shift map used for speed change ratio control.

A shift map selector 71 selects a map to be used from among plural pre-prepared maps depending on the transmission oil temperature TMP, and whether or not an exhaust gas purification catalyst has activated. FIG. 4 is an example of a shift map.

A final target input rotation speed calculating element 72 calculates a final target input rotation speed Ni* by looking up the shift map shown in FIG. 4 based on the throttle opening TVO and vehicle speed VSP. The final target rotation speed Ni* is the target value of the input rotation speed in the steady running state.

Here, when the ABS 320 and the TCS 330 are not operating, a value VSPSEN detected by the vehicle speed sensor 63 is used as the vehicle speed VSP, and when these systems are operating, an estimated vehicle speed described hereafter VSPFL is used as the vehicle speed VSP.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the auto-cruise signal, and a speed ratio difference RtoERR between the real speed ratio Ratio and a transient target ratio Ratio0 described later, and computes a difference Eip between the final target ratio i* and transient target Ratio0.

The first speed change time constant Tg1 and second speed change time constant Tg2 which are determined corresponding to a second order delay of the toroidal CVT 10, determine the speed change response relative to the final target ratio i*, and determine a speed change rate.

A transient target ratio calculating element 75 computes the transient target ratio Ratio0 and an intermediate speed ratio Ratio00 for bringing a real speed ratio Ratio close to the final target ratio i* with a speed response defined by the first speed change time constant Tg1 and second speed change time constant Tg2, and outputs the transient target Ratio0.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for compensating a torque shift (speed ratio deviation) peculiar to a toroidal CVT based on the transient target ratio Ratio0 and input torque Ti of the transmission 10.

During torque transmission, the power rollers 3 are gripped between the input disk 1 and output disk 2, so the trunnions 41 deform. Due to this deformation, the position of the precess cam 7 provided on the lower end of the trunnion 41 varies, and the characteristics of the mechanical feedback system comprising the precess cam 7 and link 8 vary resulting in the aforesaid torque shift.

As the torque shift of the toroidal CVT differs according to the transient target ratio Ratio0 and transmission input torque Ti, the torque shift compensator 77 calculates the torque shift compensation amount TSrto by looking up a predetermined two-dimensional map based on the transient target ratio Ratio0 and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio Ratio0 to compute the speed ratio error RtoERR (=Ratio0−Ratio).

A first feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fbpDATA1, fbiDATA1 and fbdDATA1 are used when a feedback correction amount FBrto is computed by PID control described later.

The first feedback gains fbpDATA1, fbiDATA1 and fbdDATA1 are computed by looking up a predetermined two-dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 10. The feedback gains fbpDATA2, fbiDATA2 and fbdDATA2 are also used when the feedback correction amount FBrto is computed by PID control, described later.

The second feedback gains fbpDATA2, fbiDATA2 and fbdDATA2 are computed by looking up a two-dimensional map based on the transmission oil temperature TMP and the line pressure PL.

A feedback gain calculating element 83 multiplies corresponding first feedback gains and second feedback gains so as to compute a proportional control feedback gain fbpDATA (=fbpDATA1×fbpDATA2), an integral control feedback gain fbiDATA (=fbiDATA1×fbiDATA2), and a differential control feedback gain fbdDATA (=fbdDATA1×fbdDATA2).

A PID controller 84 computes a feedback correction amount by proportional control (=RtoERRR×fbpDATA), a feedback correction amount by integral control (=∫{RtoERR×fbiDATA}), and a feedback correction amount by differential control (=(d/dt){RtoERR×fbdDATA}). These three feedback correction amounts are then added to compute the feedback correction amount FBrto (=RtoERR×fbpDATA+∫{RtoERR×fbiDATA}+(d/dt){RtoERR×fbdDATA}) under PID control.

A transient target ratio corrector 85 corrects the transient target ratio Ratio0 by the torque shift compensation amount TSrto and the speed ratio feedback correction amount FBrto, and computes a compensated transient target ratio DsrRT0 (=Ratio0+TSrto+FBrto).

A target step number calculating element 86 computes a target step number DsrSTP of the step motor 4 which realizes the compensated transient target ratio DsrRT0 by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 10.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRT0. First, the determining element 89 calculates a step number difference ΔSTP between the target step number DsrSTP and the command value Astep which can be considered as the actual position. When the step number error ΔSTP is smaller than a value ΔSTPLIM which the step motor 4 can eliminate during one control cycle at the maximum drive speed of the step motor 4 determined as described above by the step motor drive speed determining element 88 (ΔSTP<ΔSTPLIM), the determining element 89 determines that the step motor 4 can follow the target step number DsrSTP corresponding to the compensated transient target ratio DsrRT0. Conversely, when the step number error ΔSTP is larger than the value ΔSTPLIM (ΔSTP≧ΔSTPLIM), it determines that the step motor 4 cannot follow the target step number DsrSTP.

When it is determined that the step motor 4 can follow the target step number DsrSTP corresponding to the compensated transient target ratio DsrRT0, the determining element 89 commands the PID controller 84 to continue the computing of the speed ratio feedback correction amount FBrto by the aforesaid PID control. On the other hand, when it is determined that the step motor 4 cannot follow the target step number DsrSTP, the determining element 89 commands the PID controller to maintain the speed ratio feedback correction amount ∫{EtoERR×fbiDATA} by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astep is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRT0. Conversely, when the step number error ΔSTF is greater than the value ΔSTPLIM which is defined according to the maximum drive speed of the step motor 4 (ΔSTP≧ΔSTPLIM), it is determined that the step motor 4 cannot follow the target step number DsrSTP. Thus, the determination of the tracking ability of the step motor 4 can be performed precisely although the maximum drive speed of the step motor 4 varies according to the oil temperature TMP, etc.

Next, the speed ratio control performed by the controller 61 will be described referring to FIGS. 5–7.

Figure 5:
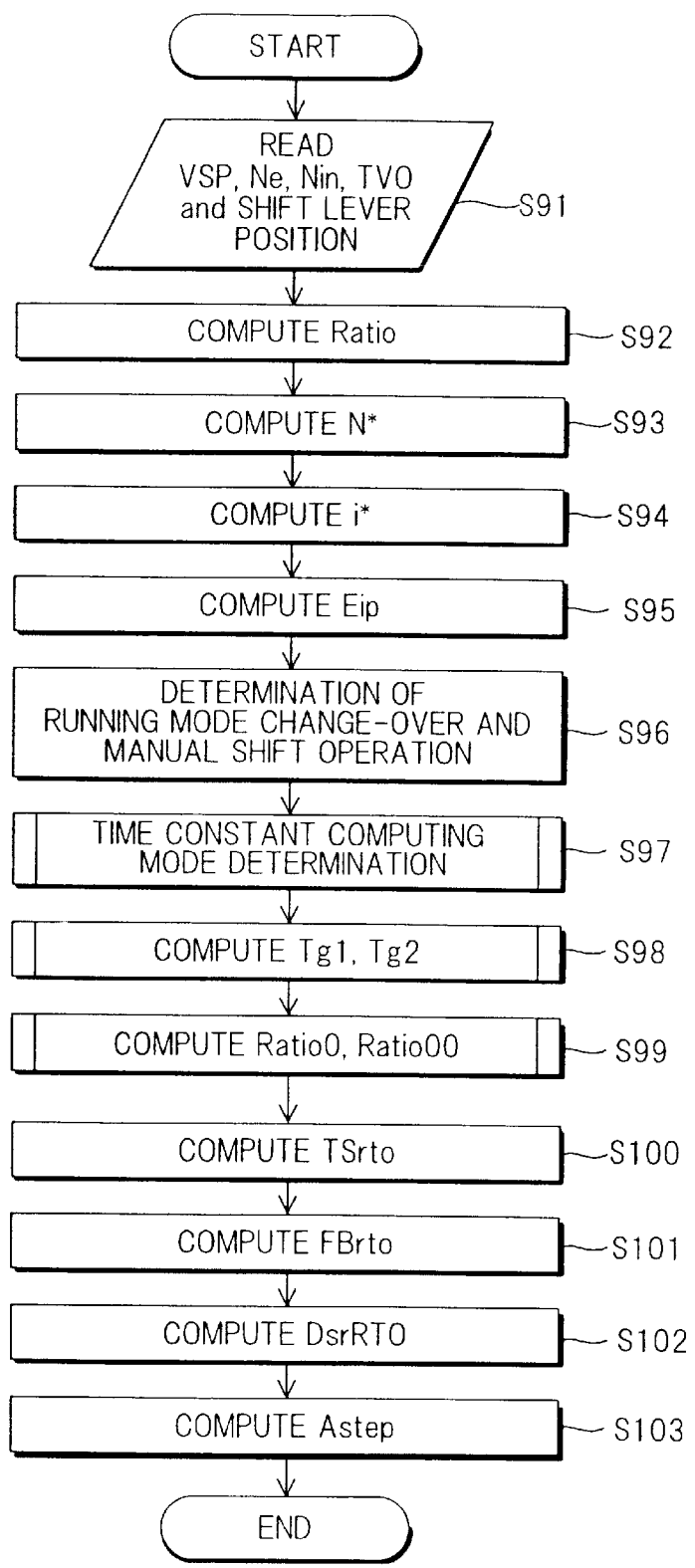
FIG. 5 is a flowchart for describing a main routine of speed change ratio control performed by the controller.

FIG. 5 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

Here, when the ABS 320 and TCS 330 are not operating, the value VSPSEN detected by the vehicle speed sensor 63 is read as the vehicle speed VSP, and when these systems are operating, the estimated vehicle speed VSPFL described hereafter is read as the vehicle speed VSP.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni* is computed based on the throttle opening TVO and vehicle speed VSP by looking up the map shown in FIG. 4. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio0 computed on the immediately preceding occasion the routine was performed (this is computed at the next step S99) from the final target ratio i*. The step S95 corresponds to processing by the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio Ratio0 and the intermediate speed ratio Ratio00 are computed, respectively. The steps S97, 98 and 99 also correspond to processing by the time constant calculating element 74.

In a step S100, the torque shift compensation amount TSrto is computed based on the transient target ratio Ratio0 and the transmission input torque Ti. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio Ratio0 to compute the compensated transient target ratio DsrRT0. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 6:
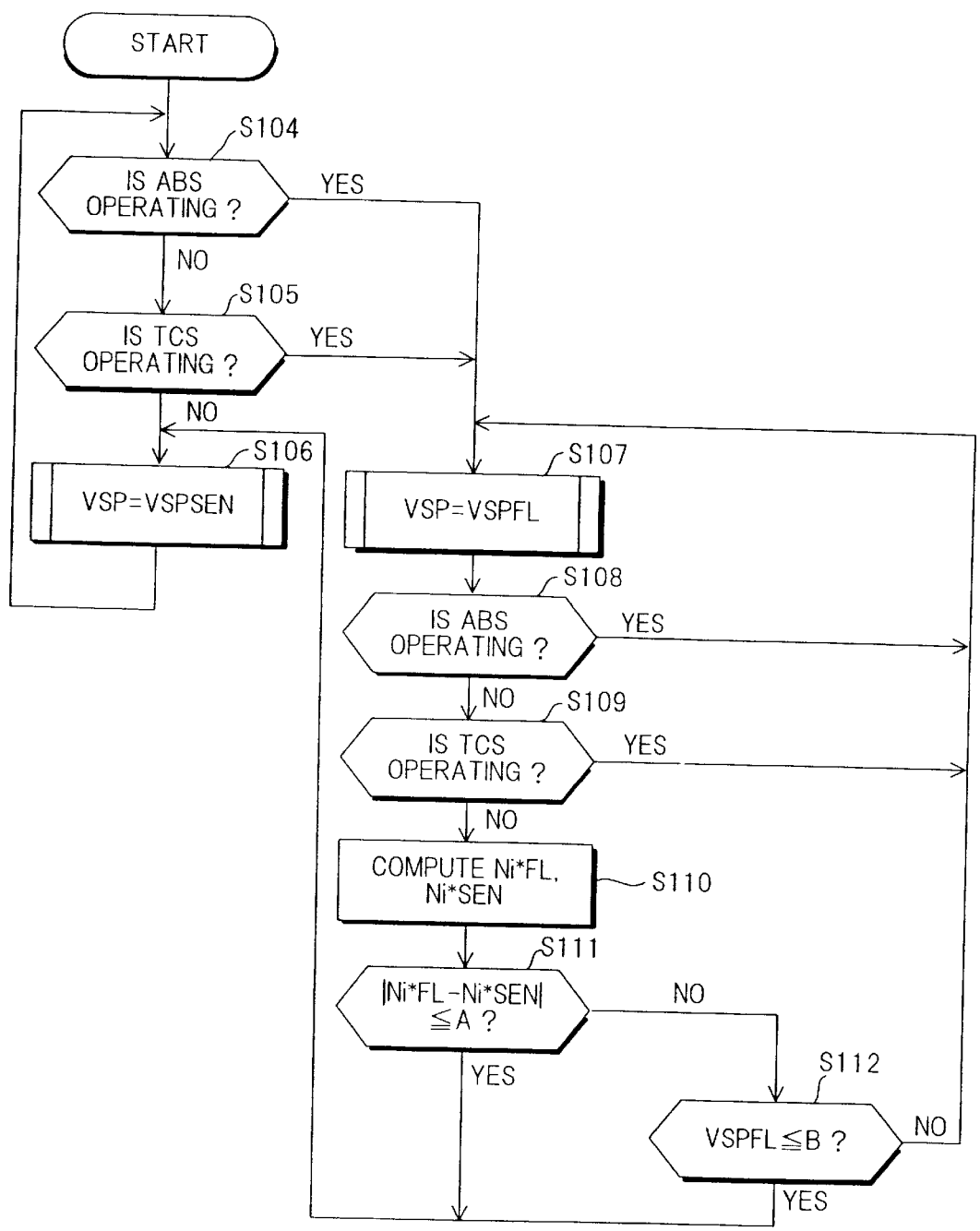
FIG. 6 is a flowchart describing a subroutine which determines a vehicle speed used for speed ratio control.

FIG. 6 shows a subroutine which determines the vehicle speed VSP used for speed ratio control. This routine corresponds to processing by the final target input rotation speed calculating element 72.

First, in a step S104, it is determined whether or not the ABS 320 is operating based on the signal from the ABS 320. If it is determined that it is not operating, the routine proceeds to a step S105, and if it is determined that it is operating, the routine proceeds to a step S107.

In a step S105, it is determined whether or not the TCS 330 is operating based on the signal from the TCS 330. If it is determined that it is not operating, the routine proceeds to a step S106, and if it is determined that it is operating, the routine proceeds to the step S107.

In the step S106, the vehicle speed VSPSEN detected by the vehicle speed sensor 63 is set as the vehicle speed VSP used for speed ratio control, and the routine returns to the step S104.

In the step S107, the estimated vehicle speed VSPFL is set as the vehicle speed VSP used for speed ratio control, and the routine proceeds to a step S108. Here, the estimated vehicle speed VSPFL is a value obtained from the driven wheel speed detected by the driven wheel speed sensor 58. The estimated vehicle speed VSPFL may also be obtained by integrating the vehicle acceleration detected by the acceleration sensor 59.

In the step S108, it is determined whether or not the ABS 320 is operating based on the signal from the ABS 320. When it is determined that it is not operating, the routine proceeds to a step S109, and when it is determined that it is operating, the routine proceeds to the step S107.

In the step S109, it is determined whether or not the TCS 330 is operating based on the signal from the TCS 330. If it is determined that it is not operating, the routine proceeds to a step S110, and if it is determined that it is operating, the routine proceeds to the step S107.

In the step S110, the final target input rotation speed Ni*FL is computed by looking up the map shown in FIG. 4 based on the throttle opening TVO and estimated vehicle speed VSPFL. Further, a final target input rotation speed Ni*SEN is computed by looking up the map shown in FIG. 4 based on the throttle opening TVO and the sensor detected vehicle speed VSPSEN.

In a step S111, it is determined whether or not the difference between the final target input rotation speed Ni*FL computed using the estimated vehicle speed VSPFL and the final target input rotation speed Ni*SEN computed using the sensor detected vehicle speed VSPSEN, is smaller than a predetermined threshold A. The maximum speed ratio variation amount permissible for passengers when the speed ratio varies due to changing over the vehicle speed VSP used for speed ratio control from the estimated vehicle speed VSPFL to the sensor detected vehicle speed VSPSEN is found by experiment, etc., and the rotation speed variation which corresponds to this value is set to the threshold A.

If the difference is determined to be smaller than the threshold A in the step S111, the routine proceeds to the step S106, and the vehicle speed VSP used for speed ratio control is changed over from the estimated vehicle speed VSPFL to the sensor detected vehicle speed VSPSEN. If it is determined to be larger than the threshold A in the step S111, the routine proceeds to a step S112.

In the step S112, it is determined whether or not the estimated vehicle speed VSPFL is smaller than a predetermined value B. Here, the value set as the minimum value of the vehicle speed VSP used for speed ratio control (the lower limit of VSP) is set to the value B. If the estimated vehicle speed VSPFL is determined to be smaller than the predetermined value B in the step S112, the routine proceeds to the step S106, and the vehicle speed VSP used for speed ratio control is changed over from the estimated vehicle speed VSPFL to the sensor detected vehicle speed VSPSEN. If the estimated vehicle speed VSPFL is determined to be larger than the predetermined value B in the step S112, the routine proceeds to the step S107.

Therefore, when neither the ABS 320 nor the TCS 330 is operating, the sensor detected vehicle VSPSEN is set as the vehicle speed VSP used for speed ratio control. On the other hand, if either of the ABS 320 or the TCS 330 begins to operate, the vehicle speed VSP used for speed ratio control will be changed over from the sensor detected vehicle speed VSPSEN to the estimated vehicle speed VSPFL.

While the ABS 320 or TCS 330 is operating, the estimated vehicle speed VSPFL is used for s ratio control. If the ABS 320 and the TCS 330 are not operating and the conditions of the step S111 or step S112 are satisfied, the vehicle speed VSP us ed for speed ratio control is changed over from the estimated vehicle speed VSPFL to the sensor detected vehicle speed VSPSEN.

Thus, when the ABS 320 or the TCS 330 are operating as the estimated vehicle speed VSPFL is set as the vehicle speed VSP used for speed ratio control, the fluctuation due to speed ratio fluctuation of the sensor detected vehicle speed VSPSEN is stopped. Moreover, the speed ratio can be prevented from varying on the large side and encouraging slip.

As the change-over is performed after checking that the speed ratio does not vary abruptly when the vehicle speed VSP used for speed ratio control is changed over the from estimated vehicle speed VSPFL to the sensor detected vehicle speed VSPSEN, shocks are also prevented from occurring during the change-over.

By the above processing, it is determined whether to use a sensor detected vehicle speed VSPSEN or an estimated vehicle speed VSPFL as a vehicle speed VSP for speed ratio control.

However, in this embodiment, if use of the estimated vehicle speed VSPFL is prohibited by a first to third processing to prohibit use of the estimated vehicle speed VSPFL, described later, use of the estimated vehicle speed VSPFL as the vehicle speed VSP used for speed ratio control will be prohibited regardless of the result of the aforesaid processing, and the sensor detected vehicle speed VSPSEN will be used for speed ratio control.

Figure 7:
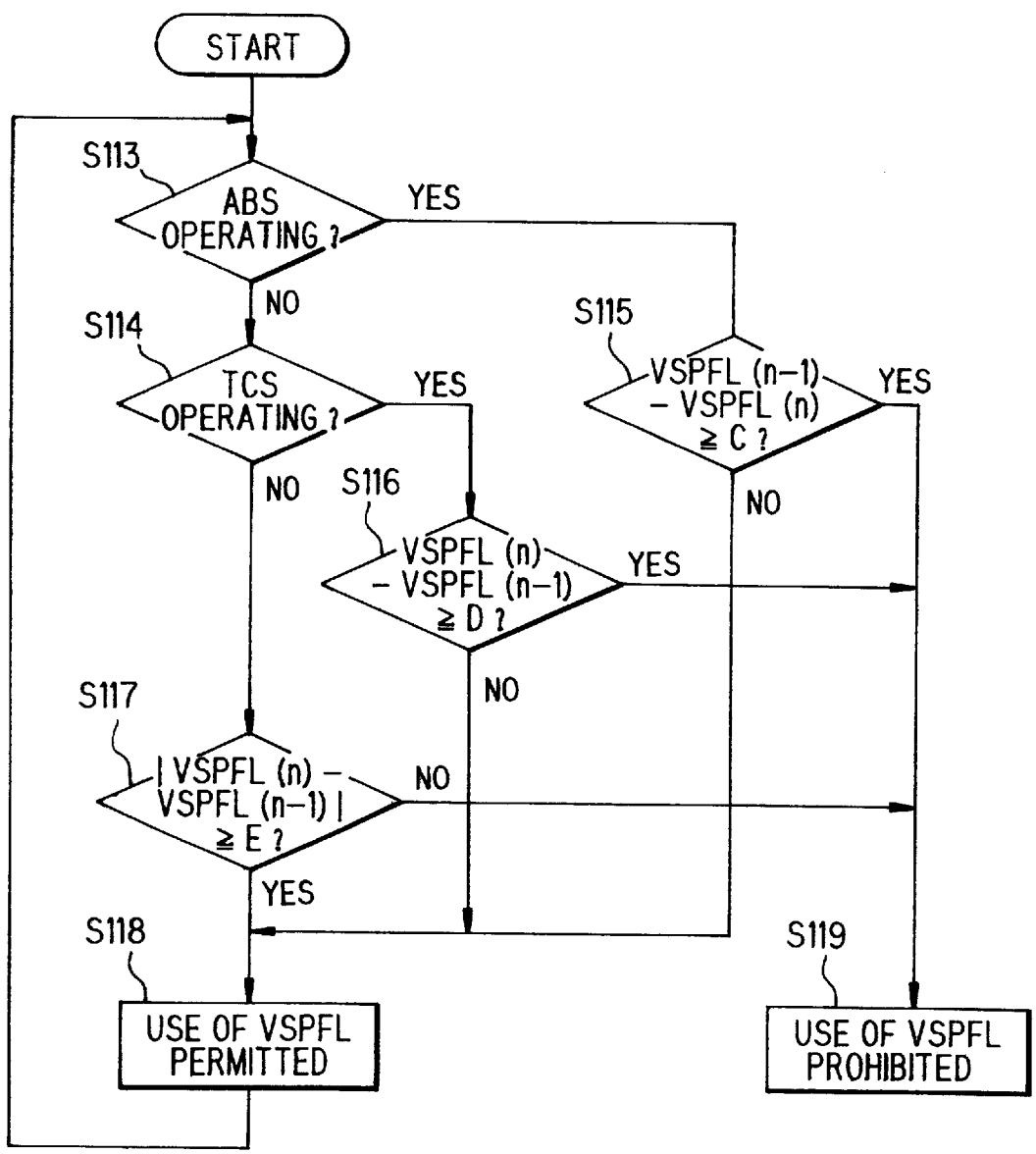
FIG. 7 is a flowchart which shows a first estimated vehicle speed use prohibition processing in speed change control.

FIG. 7 is a flowchart which shows the details of the first estimated vehicle speed use prohibition processing. This processing is also performed in the final target input rotation speed computing element 72.

First, in a step S113, it is determined whether the ABS 320 is operating based on the signal from the ABS 320. If it is determined that the ABS 320 is not operating, the routine proceeds to a step S114, and if it is determined that the ABS 320 is operating, the routine proceeds a to step S115.

In the step S114, it is determined whether the TCS 330 is operating based on the signal from the TCS 330. If it is determined that the TCS 330 is not operating, the routine proceeds to a step S117, and if it is determined that the TCS 330 is operating, the routine process to a step S116.

In the step S115, it is determined whether a difference between the estimated vehicle speed VSPFL(n) and the estimated vehicle speed VSPFL(n-1) in the previous cycle, i.e., a variation amount of the estimated vehicle speed VSPFL, is larger than a variation amount threshold C set to such a value as is impossible to obtain during operation of the ABS 320. When it is determined to be larger than the threshold C, the routine proceeds to a step S119, and use of the estimated vehicle speed VSPFL in speed ratio control is prohibited. When it is determined to be smaller than the threshold C, the routine proceeds to a step S118, and use of the estimated vehicle speed VSPFL in speed ratio control is permitted.

In the step S116, it is determined whether the difference between the estimated vehicle speed VSPFL(n-1) one cycle previously and the present estimated vehicle speed VSPFL (n) during operation of the TCS 330, i.e., the variation amount of the estimated vehicle speed VSPFL, is larger than a variation amount threshold D set to such a value as is impossible to obtain during operation of the TCS 330. When it is larger than the threshold D, routine proceeds to the step S119, and use of the estimated vehicle speed and VSPFL in speed ratio control is prohibited. When it is smaller, the routine proceeds to the step S118, and use of the estimated vehicle speed VSPFL in speed ratio control is permitted.

When neither the ABS 320 nor the TCS 330 are operating, the routine proceeds to the step S117, and it is determined whether the absolute value of the difference between the present estimated vehicle speed VSPFL(n) and the estimated vehicle speed VSPFL(n-1) one cycle previously is greater than a variation amount threshold E set as a value impossible to obtain during normal running even if for example the brake is applied sharply, or there is a sudden acceleration. The threshold E is set to a value smaller than the thresholds C, D used when the ABS 320 and TCS 330 are operating at which time there may be a large acceleration or deceleration. When the variation amount is larger than the threshold value E, the routine proceeds to the step S119, and use of the estimated vehicle speed VSPFL in speed control is prohibited, and when it is smaller, the routine proceeds to the step S118, and use of the estimated vehicle speed VSPFL in speed ratio control is permitted.

Therefore, when the estimated vehicle speed VSPFL becomes an abnormal value during operation of the ABS 320, the routine proceeds from the step S113 to the step S115. When the estimated vehicle speed VSPFL becomes an abnormal value during operation of the TCS, the routine proceeds from the step S113 to the steps S114, S116. When the estimated vehicle speed VSPFL becomes an abnormal value when neither the ABS 320 nor the TCS 330 is operating, the routine proceeds from the step S113 to the steps S114, S117.

In the steps S115, S116, S117, it is determined whether the variation amount per cycle of the estimated vehicle speed VSPFL is greater than the thresholds C, D or E. When the variation amount is greater than the thresholds C, D or E, the routine proceeds to the step S119, and use of the estimated vehicle speed VSPFL in speed ratio control is prohibited.

Even if the vehicle decelerates due to sudden braking or accelerate due to a sudden accelerator depression, the vehicle runs subject to a load or running resistance, and as there is a limit to the vehicle acceleration or deceleration, providing the estimated vehicle speed VSPFL is normal, the variation amount of the estimated vehicle speed VSPFL does not exceed a certain value. Therefore, when the variation amount of the estimated vehicle speed VSPFL does exceed a certain value, it is determined that the estimated vehicle speed VSPFL is abnormal, and use of the estimated vehicle speed VSPFL in speed ratio control is prohibited.

When it is determined that the estimated vehicle speed VSPFL is abnormal, only the sensor detected vehicle speed VSPSEN is used for speed ratio control. This therefore suppresses a sharp variation of the speed ratio when there is a change-over between the estimated vehicle speed VSPFL and the sensor detected vehicle speed VSPSEN, or when the estimated vehicle speed VSPFL is used for speed ratio control, and consequently, shift shock is prevented from occurring and slip is prevented from recurring.

When the ABS 320, which functions during sudden braking, is operating, the deceleration increases, and when the TCS 330, which functions during rapid acceleration, is operating, the acceleration increases. Hence, when the ABS 320 or TCS 330 is operating, the variation amount of the estimated vehicle speed VSPFL increases compared to when either of these systems are not operating (see FIG. 11 and FIG. 12).

If it is attempted to determine an abnormality of the estimated vehicle speed VSPFL using only one threshold, if the threshold is set to a large value, the determination that the estimated vehicle speed VSPFL is abnormal will be delayed when the ABS 320 or TCS 330 is not operating. Conversely, if the threshold is set to a small value, it will be incorrectly determined that there is an abnormality although the estimated vehicle speed VSPFL is normal when the ABS 320 or TCS 330 is operating.

According to this embodiment, a different value is set according to whether or not the ABS 320 or TCS 330 is operating, so an abnormality of the estimated vehicle speed VSPFL can be detected with rapidity and precision regardless of whether or not the ABS 320 and TCS 330 are operating.

Figure 8:
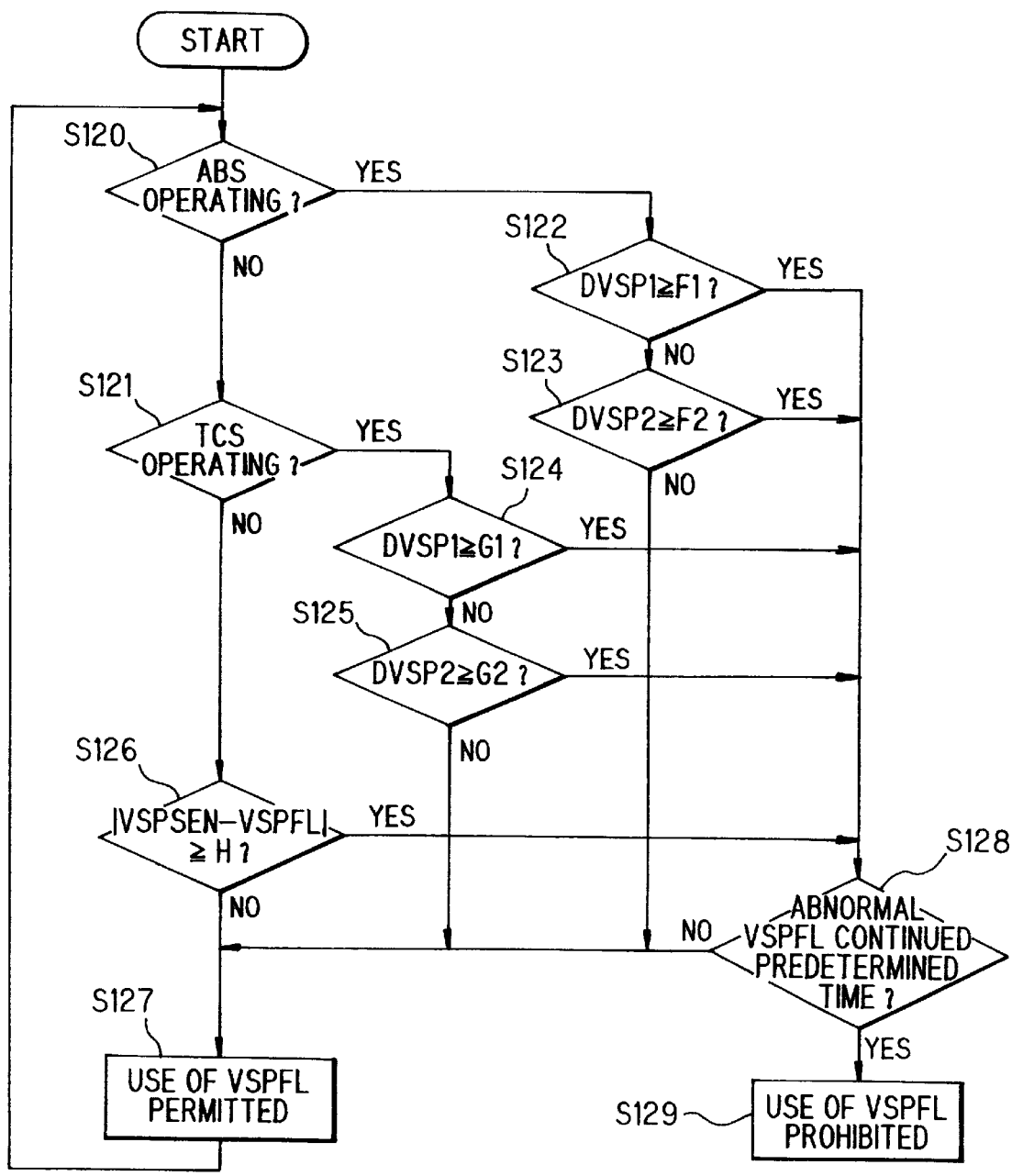
FIG. 8 is a flowchart which shows a second estimated vehicle speed use prohibition processing in speed change control.

FIG. 8 is a flowchart showing the second processing for prohibiting use of the estimated vehicle speed. This processing is also performed in the final target input rotation speed computing element 72.

First, in a step S120, it is determined whether the ABS 320 is operating based on a signal from the ABS 320. When it is determined that it is not operating, the routine proceeds to a step S121, and when it is determined that it is operating, the routine proceeds to a step S122.

In the step S121, it is determined whether the TCS 330 is operating based on a signal from the TCS 330. When it is determined that it is not operating, the routine proceeds to a step S126, and when it is determined that it is operating, routine proceeds to a step S124.

In the step S122, is determined whether a difference DVSP1 between the sensor detected vehicle speed VSPSEN and estimated vehicle speed VSPFL is larger than a speed difference threshold F1. When it is determined that the difference DVSP1 is larger than the threshold F1, the routine proceeds to a step S128, and when it is determined that it is not larger, the routine proceeds to a step S123.

In the step S123, it is determined whether a difference DVSP2 between the estimated vehicle speed VSPFL and sensor detected vehicle speed VSPSEN is larger than a speed difference threshold F2. The threshold value F2 is set to a large value than the threshold value F1. When it is determined that the difference DVSP2 is larger than the threshold value F2, the routine proceeds to a step S128, and when it is determined that it is not larger, the routine proceeds to a step S127.

In the step S124, it is determined whether the difference DVSP1 (=VSPSEN−VSPFL) is larger than a speed difference threshold G1. When it is determined that the difference DVSP1 is larger than the threshold G1, the routine proceeds to the step S128, and when it is determined that it is not larger, the routine proceeds to a step S125.

In the step S125, it is determined whether the difference DVSP2 (=VSPFL−VSPSEN) is larger than a speed difference threshold G2. When it is determined that the difference DVSP2 is larger than the threshold G2, the routine proceeds to the step S128, and when it is determined that it is not larger, the routine proceeds to the step S127.

In the step S126, it is determined whether an absolute value of a difference DVSP3 between the sensor detected vehicle speed VSPSEN and estimated vehicle speed VSPFL is larger than a speed difference threshold H. When it is determined that the absolute value of the difference DVSP3 is larger than the threshold H, the routine proceeds to the step S128, and when it is determined that it is not larger, the routine proceeds to the step S127.

In the step S127, use of the estimated vehicle speed VSPFL in speed ratio control is permitted.

In the step S128, it is determined whether a state wherein the difference between the sensor detected vehicle speed VSPSEN and estimated vehicle speed VSPFL is larger than the predetermined values F1, F2, G1, G2 or H (state wherein the estimated vehicle speed is abnormal), has continued for a predetermined time. When it is determined that the estimated vehicle speed abnormal state has not continued for the predetermined time, the routine proceeds to the step S127 and use of the estimated vehicle speed VSPFL in speed ratio control is permitted. Conversely, when it is determined that it has continued for the predetermined time, use of the estimated vehicle speed VSPFL in speed ratio control is prohibited.

Therefore, when the estimated vehicle speed VSPFL is abnormal during operation of the ABS 320, the routine proceeds from the step S120 to the steps S122, S128. When the estimated vehicle speed VSPFL is abnormal during operation of the TCS 330, the routine proceeds from the step S120 to the steps S121, S124, S125, S128. When the estimated vehicle speed VSPFL is abnormal when neither of these systems operating, the routine proceeds from the step S120 to the steps S121, S126, S128.

When a state wherein the difference between the sensor detected vehicle speed VSPSEN and the estimated vehicle speed VSPFL is greater than the thresholds F1, F2, G1, G2 or H continues for a predetermined time, use of the estimated vehicle speed VSPFL in speed ratio control is prohibited.

The ABS 320 suppresses the lock of vehicle wheels due to braking, while the TCS 330 suppresses slip of drive wheels due to driving. That is, both of these systems attempt to make the vehicle wheel speed coincide with the vehicle speed (=estimated vehicle speed). Therefore, if the estimated vehicle speed VSPFL is normal, the state where the difference between the sensor detected vehicle speed VSPSEN and the estimated vehicle speed VSPFL is greater than a certain value does not continue for a long time.

In this regard, in the prohibition processing shown in FIG. 8, it is determined that the estimated vehicle speed VSPFL as abnormal when a set time has passed while the difference between the sensor detected vehicle speed VSPSEN and the estimated vehicle speed VSPFL remains greater than the thresholds F1, F2, G1, G2, H, and use of the estimated vehicle speed VSPFL is prohibited.

Therefore, an abnormal estimated vehicle speed VSPFL is not used for speed ratio control, rapid fluctuation of the speed ratio is suppressed, and the occurrence of the shift shock or recurrence of slip is prevented.

Figure 11:
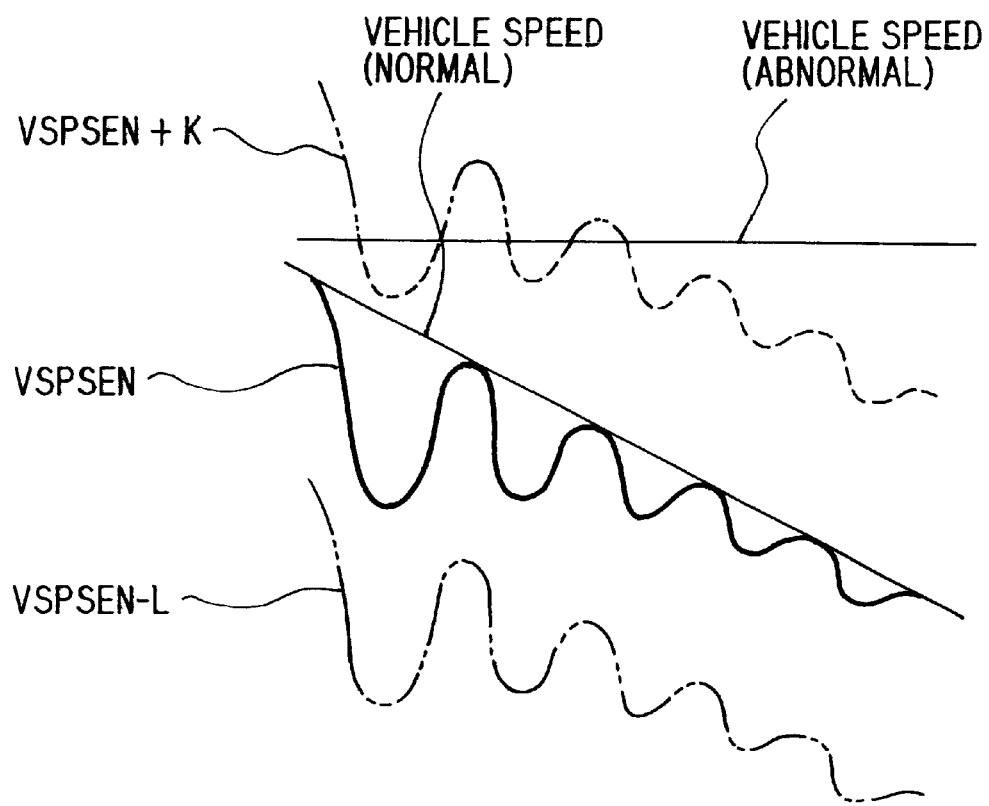
FIG. 11 is a time chart showing how the estimated vehicle speed is limited by an upper limiter when the estimated vehicle speed stays at a fixed value due to an abnormality when an anti-lock brake system (ABS) operates.
Figure 12:
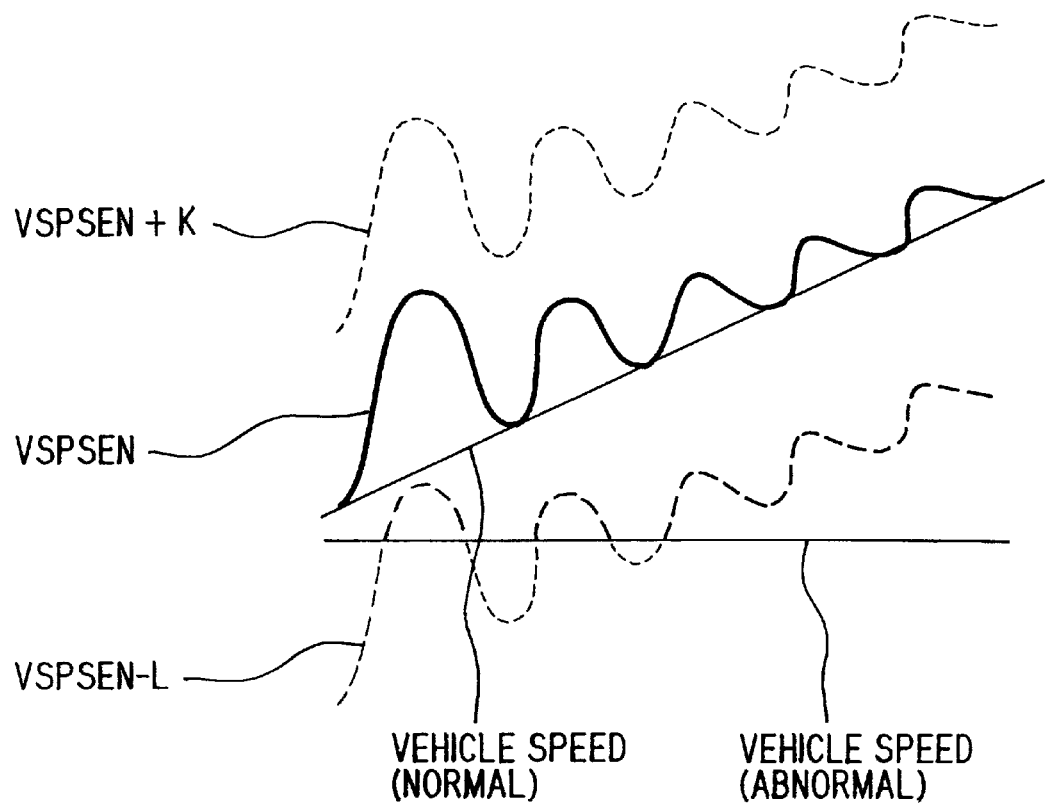
FIG. 12 is a time chart showing how the estimated vehicle speed is limited by a lower limiter when the estimated vehicle speed stays at a fixed value due to an abnormality when a traction control system (TCS) operates.

Further, when the ABS 320 is operating, the speed of the wheel which tends to lock due to braking is usually smaller than the estimated vehicle speed, and when the TCS 330 is operating, the speed of the wheel which tends to slip due to acceleration is larger than the estimated vehicle speed (see FIG. 11 and FIG. 12).

For this reason, if it is determined that the estimated vehicle speed VSPFL is abnormal from one threshold regardless of the magnitudes of the sensor vehicle detected speed VSPSEN and estimated vehicle speed VSPFL, the determination that the estimated vehicle speed is abnormal may be delayed for example even if the sensor detected vehicle speed VSPSEN is large when the ABS 320 is not operating and the estimated vehicle speed VSPFL is obviously abnormal. Alternatively, if a difference occurs between the estimated vehicle speed VSPFL and sensor detected vehicle speed VSPSEN due to operation of the ABS 320, it may be incorrectly determined that the estimated vehicle speed VSPFL is abnormal.

However, according to this invention, when the ABS 320 is operating, and the estimated vehicle speed VSPFL is larger than the sensor detected vehicle speed VSPSEN, a large value is set to the threshold F2, and when the estimated vehicle speed VSPFL is smaller than the sensor detected vehicle speed VSPSEN, a small value is set to the threshold F1. During operation of the TCS 330, when the estimated vehicle speed VSPFL is larger than the sensor detected vehicle speed VSPSEN, a small value is set to the threshold G2, and when the estimated vehicle speed VSPFL is larger than the sensor detected vehicle speed VSPSEN, a large value is set to the threshold G1. Further, when neither the ABS 320 nor the TCS 330 are operating, in genera, the estimated vehicle speed and sensor detected vehicle speed effectively coincide, so a small value is set to the threshold H.

In this way, an abnormality of the estimated vehicle speed can be detected with high precision rapidly after it has occurred regardless of the operating state of the ABS 320 and TCS 330.

Figure 9:
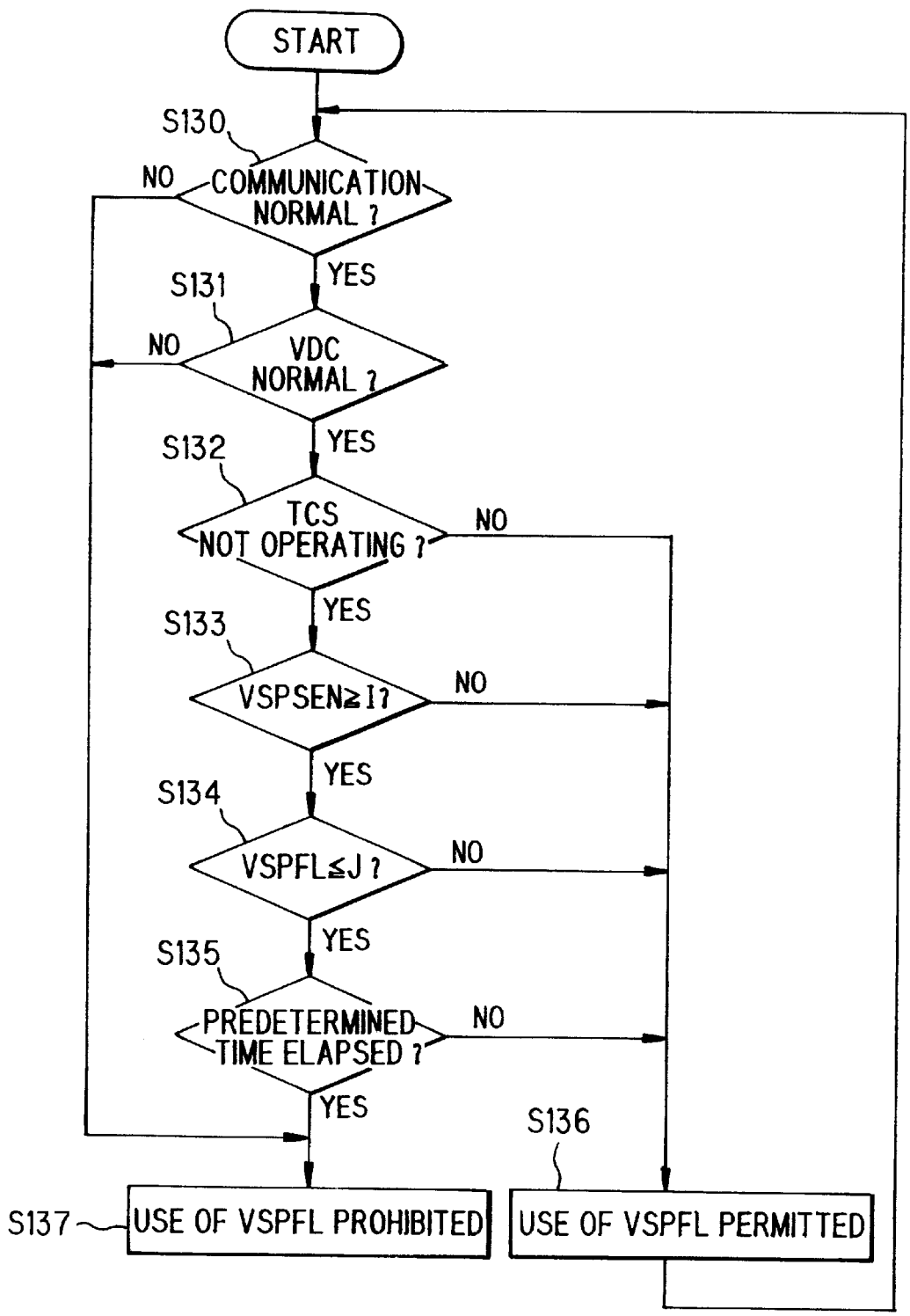
FIG. 9 is a flowchart which shows a third estimated vehicle speed use prohibition processing in speed change control.

FIG. 9 is a flowchart showing the third processing for prohibiting use of the estimated vehicle speed. Tis processing is also performed in the final target input rotation speed computing element 72.

First, in a step S130, it is determined whether communications between the ABS 320, the TCS 330, a vehicle speed sensor 63 and controller 61 are normal. When it is determined that they are not normal, the routine proceeds to a step S131, and when it is determined that they are normal, the routine proceeds to a step S137.

In the step S131, it is determined whether the VDC 350 is normal based on the signal from VDC 350 (VDC fail signal). When it is determined that the VDC 350 is normal, the routine proceeds to the step S132, and when it is determined that it is abnormal, the routine proceeds to the step S137. Here, the VDC 350 is a system which controls a vehicle behavior by controlling the brake fluid pressure supplied to each wheel.

In the step S132, it is determined whether the TCS 330 is operating based on a signal from the TCS 330. When it is determined that it is not operating, the routine proceeds to a step S133, and when it is determined that it is operating, the routine proceeds to a step S136.

In the step S133, it is determined whether the sensor detected vehicle speed VSPSEN is greater than a set value I. When it is determined that it is greater than the set value I, the routine proceeds to a step S134, and when it is determined that it is smaller, the routine proceeds to the step S136.

In the step S134, it is determined whether the estimated vehicle speed VSPFL is smaller than a threshold J to determine whether or not it is effectively zero. When it is determined that it is smaller than the threshold J, the routine proceeds to a step S135, and when it is determined that it is larger, the routine proceeds to a step S136.

In the step S135, it is determined whether a predetermined time has elapsed during which all the conditions of the step S130 to the step S134 hold. When it is determined that this time has elapsed, the routine proceeds to the step S137, and when it is determined that it has not elapsed, the routine proceeds to the step S136.

In the step S136, use of the estimated vehicle speed VSPFL in speed ratio control is permitted.

In the step S137, use of the estimated vehicle speed VSPFL in speed ratio control is prohibited.

Therefore, when the vehicle is running on the chassis dynamometer, the routine proceeds from the step S130 to the steps S131, S132, S133, S134, S135. When it is determined that a predetermined time has elapsed during which all the conditions of the steps S130 to the step S134 hold, it is determined that the vehicle is running on the chassis dynamometer (S135), and use of the estimated vehicle speed VSPFL in speed ratio control is prohibited (S137).

When it is determined that there is a communications abnormality in the step S130, and it is determined that the VDC 350 is abnormal in the step S131, precise values of the parameters used in the determination cannot be obtained, so use of the estimated vehicle speed VSPFL speed ratio control is prohibited without determining whether or not the vehicle is running on the chassis dynamometer.

Further, the same situation occurs when the road surface friction is small and the vehicle becomes stuck (when the sensor detected vehicle speed VSPSEN is not zero), but the estimated vehicle speed VSPFL is zero). In this case, the drive wheels slip and the TCS 330 operates, so the routine proceeds from the step S132 to the step S136, and it is not determined that the vehicle is running on the chassis dynamometer.

In a speed ratio control device which always uses the estimated vehicle speed VSPFL for speed ratio control when the ABS 320 or TCS 330 is operating, if these systems of operate when the vehicle is running on the chassis dynamometer, the vehicle speed VSP used for speed ratio control (=estimated vehicle speed VSPFL) suddenly becomes zero, so the sped ratio suddenly changes to the maximum speed ratio.

However, in the speed ratio control device according to this invention, use of the estimated vehicle speed VSPFL in speed ratio control is prohibited when it is determined that the vehicle is running on the chassis dynamometer, and the sensor detected vehicle speed VSPSEN is used for speed ratio control, so the aforesaid rapid change of speed ratio is prevented.

According to this invention, if the state where the estimated vehicle speed VSPFL is smaller than the predetermined value J although the sensor detected vehicle speed VSPSEN is greater than the predetermined value I, continues for a predetermined time, it is determined that the vehicle is running on the chassis dynamometer. This is because when the vehicle is running on the chassis dynamometer, although the sensor detected vehicle speed VSPSEN varies according to the running state, the driven wheels speed (=estimated vehicle speed VSPFL) is always zero regardless of the running state. Using this determination method, it can be determined with the precision whether the vehicle is running on the chassis dynamometer.

Figure 10:
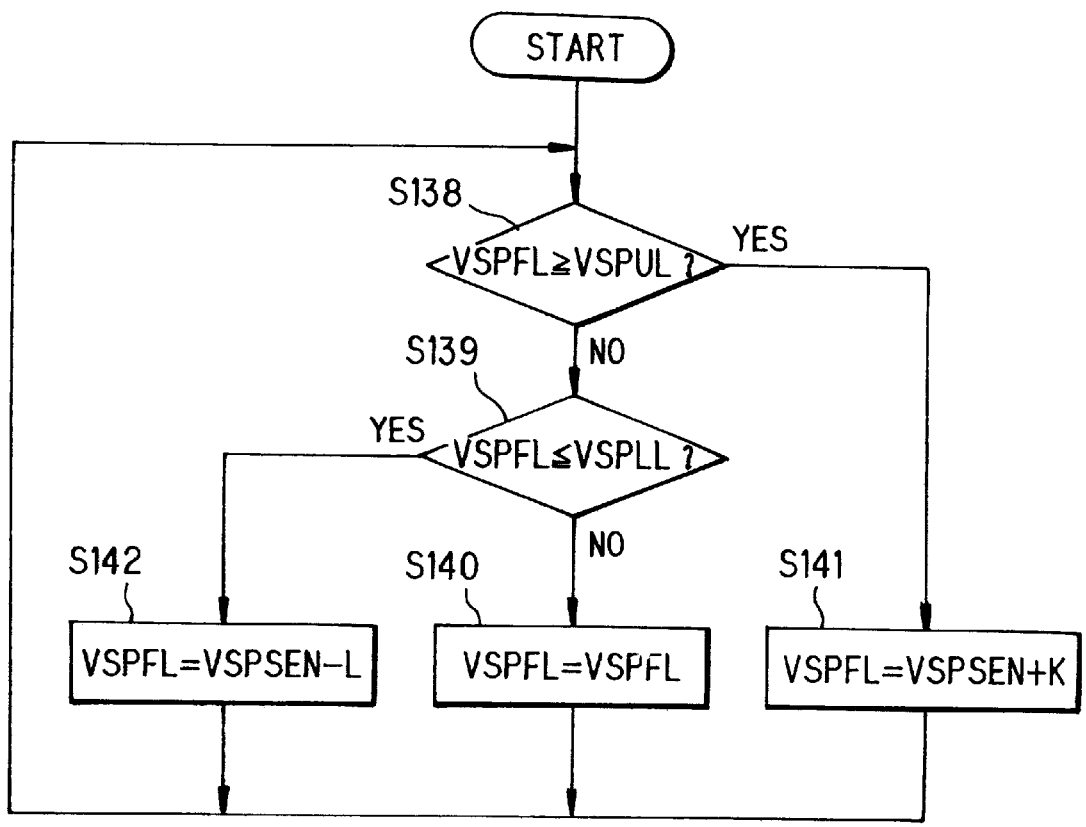
FIG. 10 is a flowchart which shows processing to limit an estimated vehicle speed in variable speed control.

FIG. 10 is a flow showing processing for limiting the estimated vehicle speed. This processing is also performed in the final target input rotation speed computing element 72.

First, in a step S138, it is determined whether or not the estimated vehicle speed VSPFL is larger than a value (upper limiter VSPUL) obtained by adding a predetermined value K to the sensor detected vehicle speed VSPSEN. When the estimated vehicle speed VSPFL is larger than the upper limiter VSPUL, the routine proceeds to a step S141, and when it is smaller, the routine proceeds to a step S139.

In the step S139, it is determined whether the estimated vehicle speed VSPFL is smaller than a value Power limiter VSPLL) obtained by subtracting a predetermined value L from the sensor detected vehicle speed VSPSEN. When is determined that the vehicle speed VSPFL is less than the lower limiter VSPLL, the routine proceeds to a step S142, and when it is determined to be larger, the routine proceeds to a step S140.

In the step S140, the estimated vehicle speed VSPFL lies within a predetermined range (VSPSEN−L<VSPFL<VSPSEN+K), so limiting of the estimated vehicle speed VSPFL is not performed.

In a step S141, the estimated vehicle speed VSPFL is limited to the upper limiter VSPUL (=VSPSEN+K).

In a step S142, the estimated vehicle speed VSPFL is limited to the lower limiter VSPLL (=VSPSEN−L).

Therefore, according to this embodiment, when the estimated vehicle speed VSPFL is used for speed ratio control, and the estimated vehicle speed VSPFL is much larger than would occur during normal running, the routine proceeds from the step S138 to the step S141, and the estimated vehicle speed VSPFL is limited to the upper limiter VSPUL. On the other hand, when the estimated vehicle speed VSPFL is much smaller than would occur during normal running, the routine proceeds from the step S138 to the steps S139, S142, and the estimated vehicle speed VSPFL is limited to the lower limiter VSPLL.

Due to this limitation, the estimated vehicle speed VSPFL used for speed ratio control when the ABS 320 or TCS 330 is operating, always lies within the range between the lower limiter VSPLL and the upper limiter VSPUL.

When the estimated vehicle speed VSPFL becomes abnormal, use of the estimated vehicle speed is prohibited by the above estimated vehicle speed use prohibition processing shown from FIG. 7 to FIG. 9. Using only this prohibition processing, an abnormal value may be used for speed ratio control from when the estimated vehicle speed VSPFL becomes abnormal to when the abnormality is determined and the estimated vehicle speed VSPFL is prohibited.

However, by performing the limitation processing shown in FIG. 10, the vehicle speed VSPFL is limited so that the difference between the estimated vehicle speed VSPFL and sensor detected vehicle speed VSPSEN always lies within a certain range, therefore even if the estimated vehicle speed VSPFL becomes abnormal and this is used for speed ratio control, a sharp speed change does not occur.

Further, during operation of the ABS 320, the speed of the vehicle wheel which tends to lock is smaller than the vehicle speed, as shown in FIG. 11, and during operation of the TCS 330, the speed of the drive wheel which tends to slip due to the drive is larger than the vehicle speed, as shown in FIG. 12.

Therefore, according to this embodiment, the value K which determines the upper limiter VSPUL is set large and the value L which determines the lower limiter VSPLL is set small during operation of the ABS 320. Conversely, the value L which determines the lower limiter VSPLL is set large and the value K which determines the upper limiter VSPUL is set small during operation of the TCS 330.

Specifically, during operation of the ABS 320, the upper limiter VSPUL is increased so that the estimated vehicle speed VSPFL is not limited by the upper limiter VSPUL when there is no error, and during operation of the TCS 330, the lower limiter VSPLL is decreased so that the estimated vehicle speed VSPFL is not limited by the lower limiter VSPLL when there is no error.

FIG. 11 shows the case where the estimated vehicle speed VSPFL is limited by the upper limiter VSPUL when the ABS 320 is operating, and the estimated vehicle speed VSPFL is abnormal and stays at a fixed value. Likewise, FIG. 12 shows the case where the estimated vehicle speed VSPFL is limited by the lower limiter VSPLL when the TCS 330 is operating, and the estimated vehicle speed VSPFL is abnormal and stays at a fixed value.

Hence, as the difference between the estimated vehicle speed VSPFL and sensor detected vehicle speed VSPSEN always lies within a predetermined range even if the estimated vehicle speed VSPFL is abnormal, a sudden speed change is prevented even if the abnormal estimated vehicle speed VSPFL is used for speed ratio control.

This invention is not limited to the aforesaid embodiments. For example, the invention may be applied also to a speed ratio control device for a vehicle equipped with a V-belt CVT.

The entire contents of Japanese Patent Application P11-280362 (filed Sep. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control device used with a vehicle comprising a continuously variable transmission and a slip control system for suppressing a slip of a drive wheel by controlling either of braking force and drive force, comprising:
   a sensor which detects a vehicle speed,
   an actuator which varies a speed ratio of the transmission, and
   a microprocessor programmed to:
      estimate a vehicle speed based on a running state,
      compute a target speed ratio of the transmission based on the sensor detected vehicle speed when the slip control system is not operating,
      compute the target speed ratio of the transmission based on the estimated vehicle speed when the slip control system is operating,
      control the actuator so that the speed ratio of the transmission approaches the target speed ratio,
      determine whether the estimated vehicle speed is abnormal, and
      prohibit use of the estimated vehicle speed in speed ratio control when it is determined that the estimated vehicle speed is abnormal.

2. A speed ratio control device as defined in claim 1, wherein the microprocessor is further programmed to:
   determine whether a variation amount of the estimated vehicle speed is larger than a variation amount threshold set to a value which is impossible to achieve when the estimated vehicle speed is normal, and
   determine that the estimated vehicle speed is abnormal when it is determined that the variation amount of the estimated vehicle speed is larger than the threshold.

3. A speed ratio control device as defined in claim 2, wherein the threshold is set larger when the slip control system is operating than when the slip control system is not operating.

4. A speed ratio control device as defined in claim 1, wherein the microprocessor is further programmed to:
   determine whether the difference between the sensor detected vehicle speed and estimated vehicle speed is greater than a speed difference threshold set to a value impossible to achieve when the estimated vehicle speed is normal, and
   determine that the estimated vehicle speed is abnormal when a state where the difference is larger than the speed difference threshold continues for a predetermined time.

5. A speed ratio control device as defined in claim 4, wherein the speed difference threshold is set to a different value according to whether the slip control system is operating or is not operating.

6. A speed ratio control device as defined in claim 5, wherein, when the slip control system is operating, the speed difference threshold is set to a different value according to whether the slip control system is controlling braking force or controlling drive force.

7. A speed ratio control device as defined in claim 6, wherein, when the slip control system is operating, the speed difference threshold is set to a different value according to whether the estimated vehicle speed or the sensor detected vehicle speed is larger.

8. A speed ratio control device as defined in claim 5, wherein, when the slip control system is not operating, the speed difference threshold is set to a fixed value smaller than the threshold used when the slip control system (320, 330) is operating regardless of the magnitudes of the sensor detected vehicle speed and estimated vehicle speed.

9. A speed ratio control device as defined in claim 1, wherein the microprocessor is further programmed to:
   determine whether the vehicle is running on a chassis dynamometer, and
   determine that the estimated vehicle speed is abnormal when it is determined that the vehicle is running on the chassis dynamometer.

10. A speed ratio control device as defined in claim 9, wherein the microprocessor is further programmed to determine that the vehicle is running on the chassis dynamometer when a state wherein the sensor detected vehicle speed is not zero and the estimated vehicle speed is zero, continues for longer than a predetermined time.

11. A speed ratio control device as defined in claim 1, wherein the microprocessor is further programmed to:

determine whether the estimated vehicle speed is greater than an upper miter based on the sensor detected vehicle speed, determine whether the estimated vehicle speed is smaller than a lower limiter based on the sensor detected vehicle speed, and limit the estimated vehicle speed to the upper limiter when it is determined that the estimated vehicle speed is greater than the upper limiter, and limit the estimated vehicle speed to the lower limiter when it is determined that the estimated vehicle speed is smaller than the lower limiter.

12. A speed ratio control device as defined in claim 11, wherein the microprocessor is further programmed to:

compute the upper limiter by adding a first predetermined value to the sensor detected vehicle speed, compute the lower limiter by subtracting a second predetermined value from the sensor detected vehicle speed, and increase the first predetermined value and decrease the second predetermined value when the braking force is controlled by the slip control system.

13. A speed ratio control device as defined in claim 11, wherein the microprocessor is further programmed to:

compute the upper limiter by adding a first predetermined value to the sensor detected vehicle speed, compute the lower limiter by subtracting a second predetermined value from the sensor detected vehicle speed, and increase the second predetermined value and decrease the first predetermined value when the drive force is controlled by the slip controller.

14. A speed ratio control device used with a vehicle comprising a continuously variable transmission and a slip control system for suppressing a slip of a drive wheel by controlling either of brig force and drive force, comprising:

means for detecting a vehicle speed, an actuator which vanes a speed ratio of the transmission, means for estimating the vehicle speed based on a running state, means for computing a target speed ratio of the transmission based on the sensor detected vehicle speed when the slip control system is not operating, means for computing the target speed ratio of the transmission based on the estimated vehicle speed when the slip control system is operating, means for controlling the actuator so that the speed ratio of the transmission approaches the target speed ratio, means for determining whether the estimated vehicle speed is abnormal, and means for prohibit use of the estimated vehicle speed in speed ratio control when it is determined that the estimated vehicle speed is abnormal.

* * * * *